US011999499B2

(12) United States Patent
Lisio et al.

(10) Patent No.: US 11,999,499 B2
(45) Date of Patent: *Jun. 4, 2024

(54) AUTOTHROTTLE CONTROL FOR TURBOPROP ENGINES

(71) Applicant: PRATT & WHITNEY CANADA CORP., Longueuil (CA)

(72) Inventors: Carmine Lisio, Laval (CA); Kenneth Matheson, Montreal (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 739 days.

This patent is subject to a terminal disclaimer.

(21) Appl. No.: 16/775,489

(22) Filed: Jan. 29, 2020

(65) Prior Publication Data
US 2020/0164996 A1 May 28, 2020

Related U.S. Application Data

(63) Continuation of application No. 15/446,262, filed on Mar. 1, 2017, now Pat. No. 10,604,268.

(Continued)

(51) Int. Cl.
*B64C 19/02* (2006.01)
*B64C 11/30* (2006.01)
(Continued)

(52) U.S. Cl.
CPC ............. *B64D 31/06* (2013.01); *B64C 11/30* (2013.01); *B64C 11/303* (2013.01); *B64D 27/10* (2013.01);
(Continued)

(58) Field of Classification Search
CPC ....... B64C 19/02; B64C 11/30; B64C 11/303; B64C 11/305; B64D 27/10; B64D 31/06;
(Continued)

(56) References Cited

U.S. PATENT DOCUMENTS 4,513,235 A * 4/1985 Acklam ............... B60K 26/021
318/687
4,516,063 A * 5/1985 Kaye ..................... B64C 13/507
123/480

(Continued)

FOREIGN PATENT DOCUMENTS

| CN | 104936859 A | 9/2015 |
| CN | 104976056 A | 10/2015 |

(Continued)

OTHER PUBLICATIONS

European Search Report dated Mar. 29, 2018 in connection with European Patent Application No. 18157834.5.
(Continued)

*Primary Examiner* — Richard A Goldman
(74) *Attorney, Agent, or Firm* — Norton Rose Fulbright Canada LLP

(57) ABSTRACT

There are described methods and systems for controlling an aircraft. The system comprises a power plant controller configured for controlling operation of an engine and a propeller coupled to the engine, a power throttle having at least one throttle lever to regulate output power of the engine and thrust produced by the propeller, and an autothrottle controller operatively connected to the power plant controller and to the power throttle and configured to modulate engine power without pilot input by causing a change to at least one setting of the power throttle.

14 Claims, 6 Drawing Sheets

Related U.S. Application Data

(60) Provisional application No. 62/461,918, filed on Feb. 22, 2017.

(51) Int. Cl.
  *B64D 27/10* (2006.01)
  *B64D 31/06* (2006.01)
  *F02C 9/58* (2006.01)

(52) U.S. Cl.
  CPC .......... *F02C 9/58* (2013.01); *F05D 2220/325* (2013.01); *F05D 2270/051* (2013.01); *F05D 2270/122* (2013.01)

(58) Field of Classification Search
  CPC ...... F02C 9/58; F02C 9/00; F02C 9/16; F02C 9/26; F05D 2220/325; F05D 2220/051; F05D 2220/122
  USPC ............................ 701/3, 100; 60/239, 39.282
  See application file for complete search history.

(56) References Cited

U.S. PATENT DOCUMENTS

| | | | | |
|---|---|---|---|---|
| 5,006,993 | A * | 4/1991 | Virnig | F02C 9/42 701/99 |
| 5,039,037 | A * | 8/1991 | DeLuca | G05D 1/0638 244/175 |
| 5,078,345 | A * | 1/1992 | De Vries | G05D 1/063 244/188 |
| 5,315,819 | A * | 5/1994 | Page | F02C 9/28 60/39.282 |
| 5,331,559 | A * | 7/1994 | High | B64C 11/303 416/34 |
| 5,416,699 | A * | 5/1995 | DiValentin | B64C 11/305 701/99 |
| 6,171,055 | B1 | 1/2001 | Vos et al. | |
| 6,224,021 | B1 | 5/2001 | Tanaka | |
| 6,459,963 | B1 * | 10/2002 | Bennett | F02C 9/28 701/14 |
| 6,468,035 | B1 * | 10/2002 | Otake | B64C 11/305 416/37 |
| 6,739,210 | B1 * | 5/2004 | Smith | B64D 31/04 74/335 |
| 6,748,744 | B2 * | 6/2004 | Peplow | F02C 9/48 60/773 |
| 6,973,915 | B1 * | 12/2005 | Henle | B64D 31/04 123/399 |
| 7,774,106 | B2 * | 8/2010 | Calandra | B64D 31/08 701/14 |
| 8,271,151 | B2 * | 9/2012 | Hasan | G05D 1/0858 701/3 |
| 8,414,260 | B2 | 4/2013 | Johnson | |
| 8,566,000 | B2 * | 10/2013 | Lickfold | F02C 9/32 701/100 |
| 8,651,811 | B2 * | 2/2014 | Danielson | B64C 11/303 416/49 |
| 8,682,562 | B2 * | 3/2014 | Shepler | F02C 9/285 701/99 |
| 9,002,615 | B2 * | 4/2015 | Kumar | F02C 9/28 385/12 |
| 9,008,943 | B2 | 4/2015 | Lickfold et al. | |
| 9,051,044 | B2 * | 6/2015 | Talasco | B64C 11/306 |
| 9,157,377 | B2 | 10/2015 | Lickfold et al. | |
| 9,376,213 | B2 * | 6/2016 | Rolt | B64D 27/24 |
| 9,440,747 | B1 * | 9/2016 | Welsh | G05D 1/0061 |
| 9,470,604 | B2 * | 10/2016 | Javelot | F01D 21/20 |
| 9,475,572 | B2 * | 10/2016 | Collingbourne | B64C 19/00 |
| 9,506,405 | B2 * | 11/2016 | Vos | F02C 9/00 |
| 9,564,056 | B1 * | 2/2017 | Ghaemi | G06F 17/13 |
| 10,106,269 | B1 * | 10/2018 | Thornton | B64D 45/00 |
| 10,604,268 | B2 * | 3/2020 | Lisio | B64C 11/303 |
| 11,124,309 | B2 * | 9/2021 | Vertenoeuil | B64D 31/14 |
| 11,162,433 | B2 * | 11/2021 | Cipolla | F02C 9/00 |
| 2007/0110577 | A1 * | 5/2007 | Danielson | B64C 11/303 416/1 |
| 2008/0019804 | A1 * | 1/2008 | Toyoda | H01L 21/67775 414/801 |
| 2008/0029653 | A1 * | 2/2008 | Johnson | F02C 9/28 244/175 |
| 2009/0326745 | A1 * | 12/2009 | Ramos | B64D 31/08 701/14 |
| 2012/0149516 | A1 * | 6/2012 | Larrabee | B63H 23/18 475/5 |
| 2013/0147204 | A1 * | 6/2013 | Botti | F02B 63/04 903/903 |
| 2013/0227950 | A1 * | 9/2013 | Anderson | F01B 21/00 60/718 |
| 2014/0097300 | A1 * | 4/2014 | Kennedy | B64C 13/04 244/229 |
| 2015/0014480 | A1 * | 1/2015 | Lebernicheux | B64C 13/34 244/99.3 |
| 2015/0267619 | A1 * | 9/2015 | Khalid | G05B 13/042 701/100 |
| 2016/0069277 | A1 * | 3/2016 | Meisner | F02C 9/28 60/773 |
| 2016/0122001 | A1 * | 5/2016 | Kennedy | B64C 13/12 244/223 |
| 2016/0159461 | A1 * | 6/2016 | Lu | F02C 9/58 416/1 |
| 2016/0208639 | A1 * | 7/2016 | Cai | G05B 13/048 |
| 2016/0229547 | A1 * | 8/2016 | Fisher | B64D 31/06 |
| 2016/0236790 | A1 * | 8/2016 | Knapp | B64C 11/001 |
| 2016/0238484 | A1 * | 8/2016 | Veyrat-Masson | F16K 37/005 |
| 2016/0311548 | A1 * | 10/2016 | Thiriet | F01D 21/02 |
| 2016/0312706 | A1 * | 10/2016 | Veyrat-Masson | F02C 7/232 |
| 2016/0325843 | A1 * | 11/2016 | Ripley | F02C 9/28 |
| 2017/0081038 | A1 * | 3/2017 | Looper | B64D 31/04 |
| 2017/0323571 | A1 * | 11/2017 | Lissajoux | G08G 5/0052 |
| 2018/0017209 | A1 * | 1/2018 | Pedrami | B64C 11/303 |
| 2018/0170567 | A1 * | 6/2018 | Hedrick | B64D 31/06 |
| 2018/0237125 | A1 * | 8/2018 | Lisio | B64D 31/06 |
| 2019/0210736 | A1 * | 7/2019 | Vertenoeuil | B64D 31/04 |
| 2020/0182183 | A1 * | 6/2020 | Hunter | B64D 31/04 |
| 2020/0385133 | A1 * | 12/2020 | Ruhan | F02C 3/00 |
| 2022/0372922 | A1 * | 11/2022 | Eddy | F02D 11/04 |

FOREIGN PATENT DOCUMENTS

| | | |
|---|---|---|
| EP | 0392968 | 10/1990 |
| WO | 2015053930 | 4/2015 |

OTHER PUBLICATIONS

European Patent Office, Communication re. extended European search report for European patent application No. 23164482.4, Jun. 28, 2023.

* cited by examiner

AUTOTHROTTLE CONTROL FOR TURBOPROP ENGINES

CROSS-REFERENCE TO RELATED APPLICATIONS

The present application is a continuation of U.S. patent application Ser. No. 15/446,262 filed on Mar. 1, 2017, which claims the benefit of U.S. Provisional Patent Application No. 62/461,918 filed on Feb. 22, 2017, the contents of which are hereby incorporated by reference.

TECHNICAL FIELD

The disclosure relates generally to the integration of an autothrottle function into a propeller-driven aircraft between the aircraft systems and the powerplant systems (i.e. engine and propeller).

BACKGROUND OF THE ART

Modern large commuter turbofan-powered aircraft incorporate a high level of automation in regards to flight management. This includes autopilot, flight director, and autothrust systems. Similar systems exist in high-end business jet aircraft.

The increased complexity of dealing with the two powerplant components that make up the turboprop powerplant system, namely the engine and the propeller, have made it more difficult to introduce such systems. Therefore, there is a need for improvement.

SUMMARY

In accordance with a first broad aspect, there is provided an aircraft control system comprising a power plant controller configured for controlling operation of an engine and a propeller coupled to the engine, a power throttle having at least one throttle lever to regulate output power of the engine and thrust produced by the propeller, and an autothrottle controller operatively connected to the power plant controller and to the power throttle and configured to modulate engine power without pilot input by causing a change to at least one setting of the power throttle.

In accordance with another broad aspect, there is provided a method for controlling an aircraft. The method comprises controlling operation of an engine of the aircraft and a propeller coupled to the engine using a power plant controller, regulating output power of the engine and thrust produced by the propeller through a power throttle having at least one throttle lever, and modulating engine power without pilot input by causing a change to at least one setting of the power throttle using an autothrottle controller.

DESCRIPTION OF THE DRAWINGS

Reference is now made to the accompanying figures in which.

DETAILED DESCRIPTION

Figure 1:
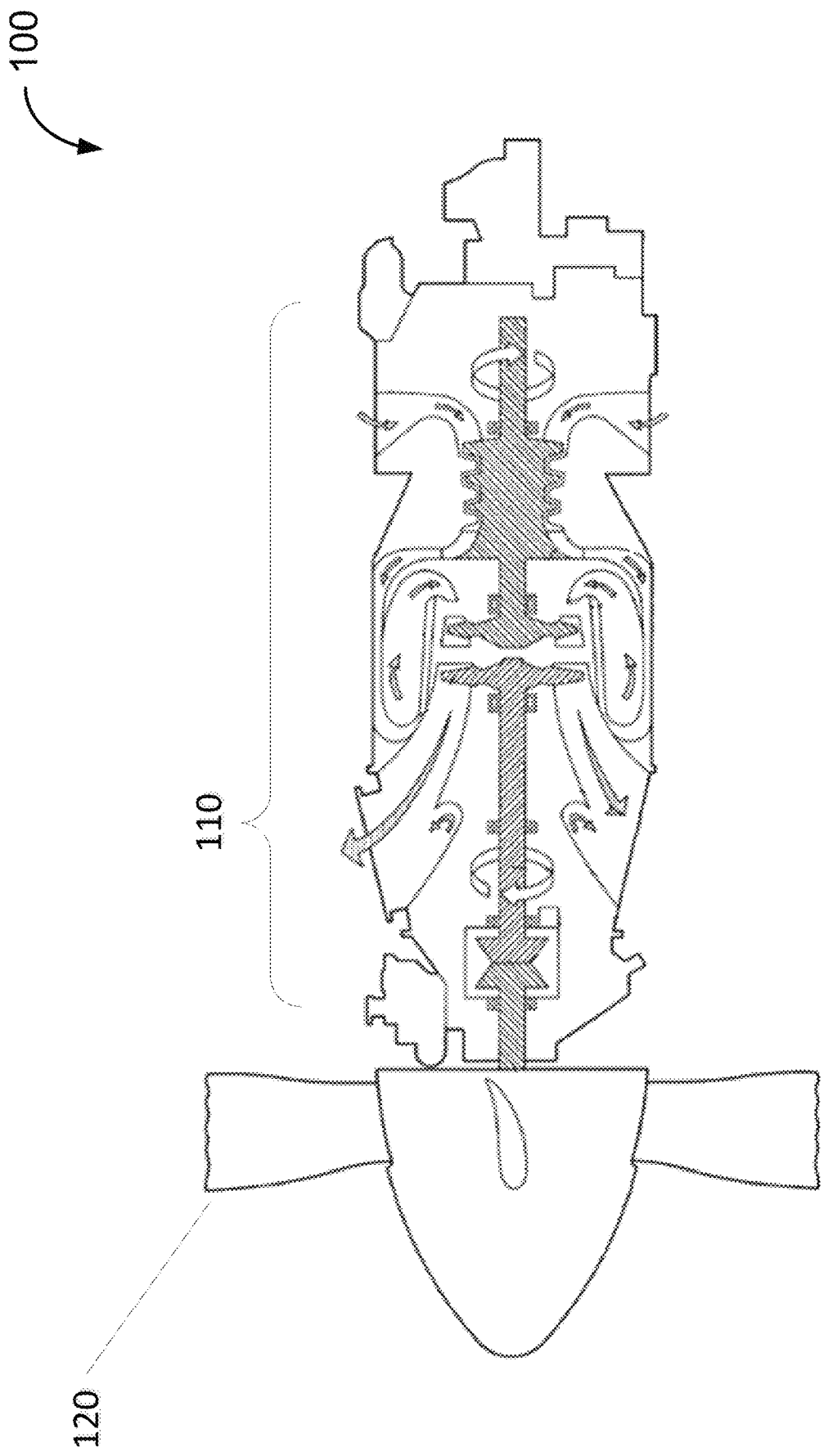
FIG. 1 a schematic cross-sectional view of an example powerplant of a propeller-driven aircraft.

There is described herein systems and methods for an autothrottle system on a propeller-driven aircraft. With reference to FIG. 1, there is illustrated a powerplant 100 for a propeller-driven aircraft, generally comprising an engine 110 and a propeller 120. The propeller 120 converts rotary motion from a shaft of the engine 110 to provide propulsive force, i.e. thrust, for the aircraft. The thrust generated by the powerplant 100 can be broken down into two contributors: the propeller thrust (FNP) and the engine jet thrust (FENJ). For a turboprop engine, about 95% to 97% of the total thrust is attributable to FNP while 5% to 3% of the total thrust is attributable to FENJ. The propeller thrust is a function of many factors, such as ambient temperature, ambient pressure/altitude, airspeed, propeller rotational speed, and power input to the propeller by the engine, and the airfoil design of the propeller blades.

The powerplant 100 of FIG. 1 is a turboprop engine, but it could also be any other type of engine comprising a propeller 120, such as a piston engine, a turboshaft engine, and the like.

Figure 2:
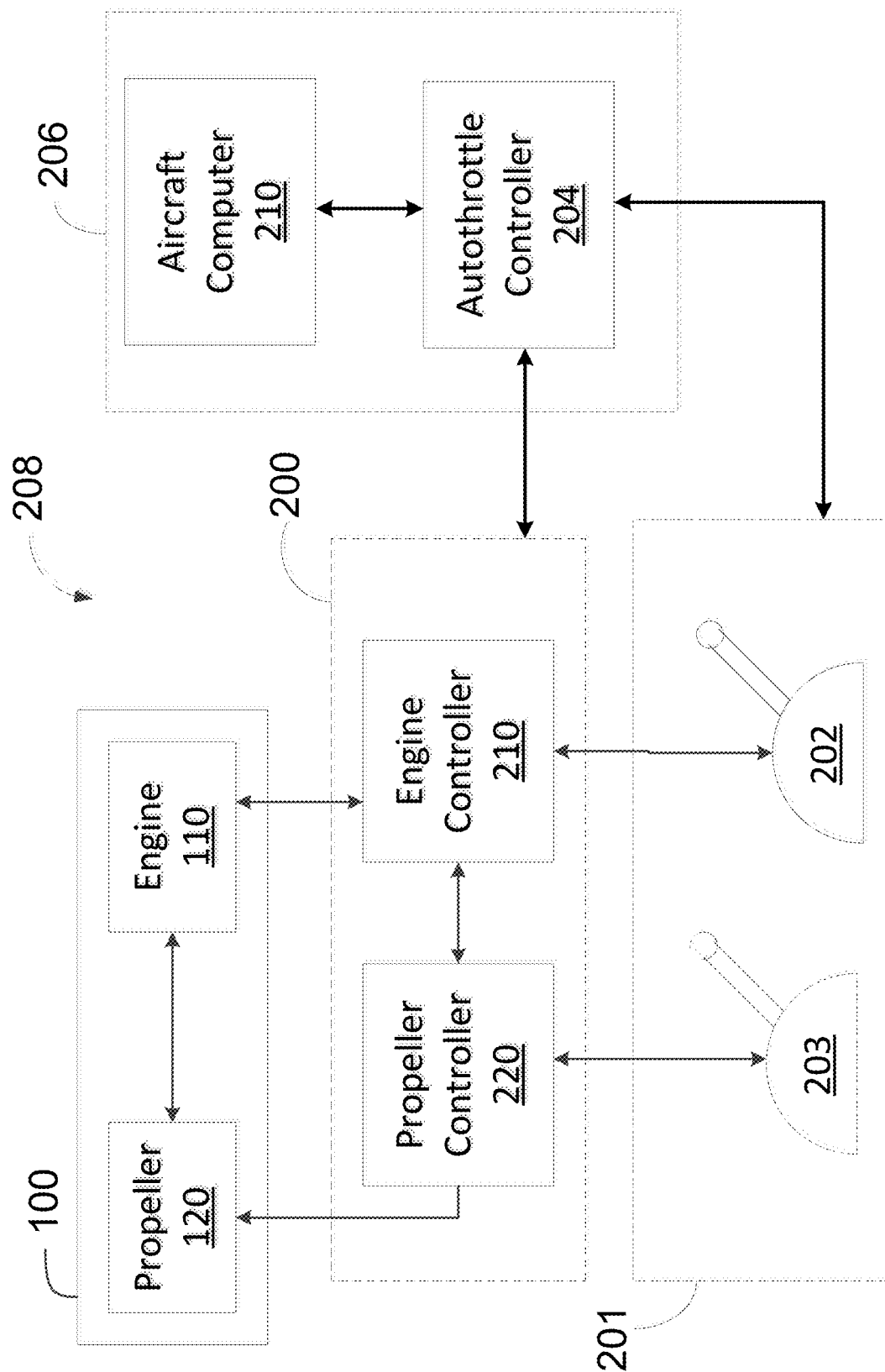
FIG. 2 is a block diagram of an example aircraft control system.

In regular operation, the engine 110 and the propeller 120 are regulated by a pilot or other operator by way of various control inputs. With reference to FIG. 2, there is illustrated an example aircraft control system 208 comprising a powerplant control system (PCS) 200. The PCS 200 is configured for controlling operation of the powerplant 100, comprising engine 110 and propeller 120. An engine controller 210 regulates fuel flow to the engine 110 in order to generate a desired engine output power. A propeller controller 220 sets blade pitch angle and/or propeller rotational speed of the propeller 120, so as to convert the engine output power from the engine 110 into thrust.

A power throttle 201 is controlled by the pilot or other operator in order to provide engine and propeller settings to the powerplant 100 via the PCS 200. In some embodiments, the power throttle comprises a throttle lever 202 to regulate the output power of the engine 110 and a condition lever 203 to regulate the thrust produced by the propeller 120. In other embodiments, the power throttle comprises a single lever 202 to control both the engine 110 and the propeller 120.

An autothrottle controller 204 is operatively connected to the PCS 200 and the power throttle 201. The autothrottle controller 204 modulates engine power without pilot input. It may be used, for example, when the aircraft is set to autopilot, but may also be used outside of the autopilot mode. In some embodiments, the autothrottle controller 204 is integrated into aircraft avionics 206, for example as part of an aircraft computer. Alternatively, the autothrottle controller communicates with the aircraft avionics 206 but is provided externally thereto, such as in the PCS 200 or as another separate component of the aircraft control system 208.

Figure 3:
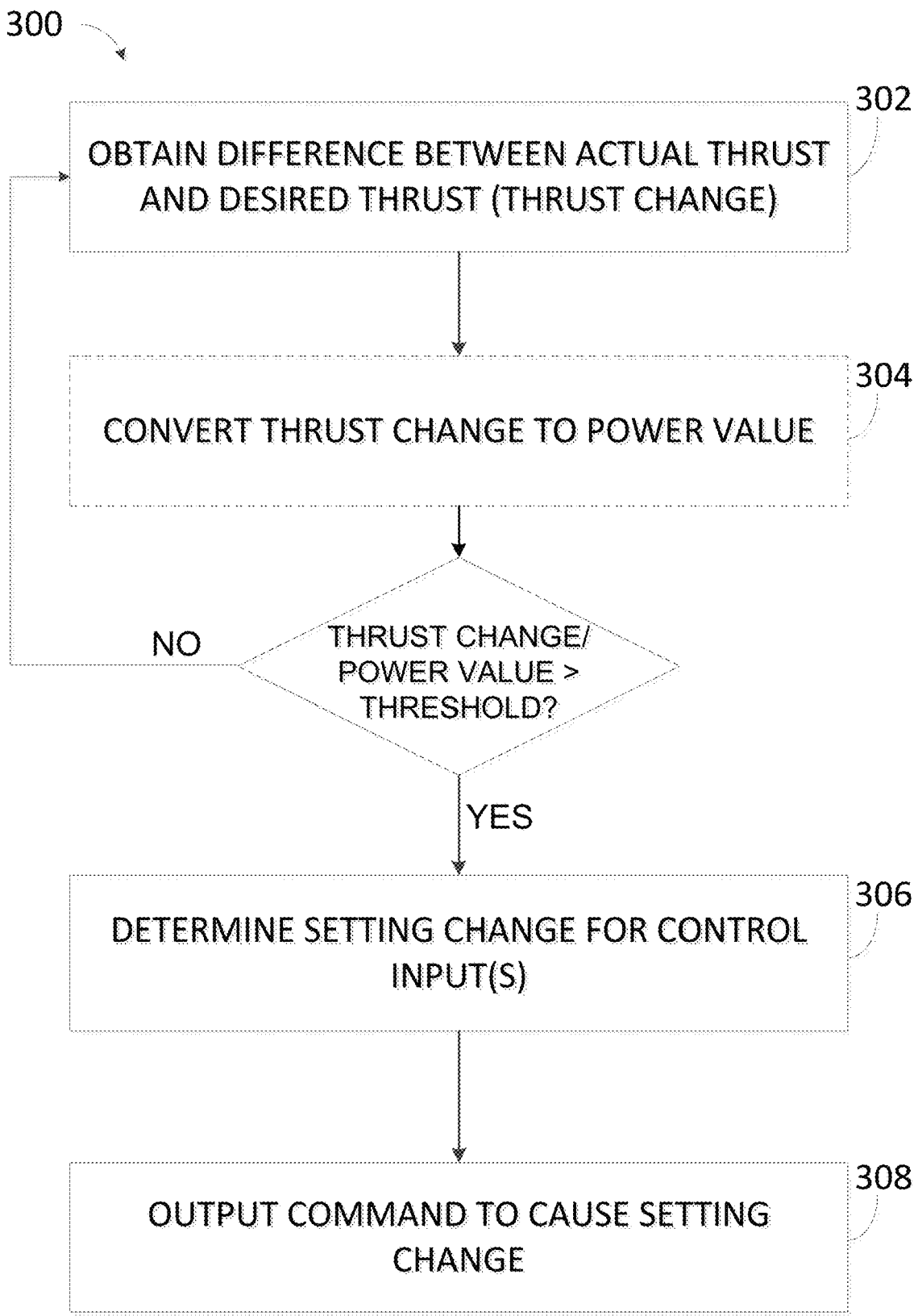
FIG. 3 is a flowchart of an example method for autothrottle in a propeller-driven aircraft

Referring to FIG. 3, there is illustrated a flowchart of an example method 300 for autothrottle as performed by the autothrottle controller 204. At 302, a required thrust change is obtained. The thrust change corresponds to a difference between an actual thrust generated by the powerplant 100 and a desired thrust in accordance with the inputs provided to the powerplant 100. For example, in a single lever configuration, the current position of the power throttle 201, also referred to as the power lever angle (PLA), will dictate a requested engine power and a corresponding reference propeller governing speed, which may be used to determine the desired thrust. Similarly, the actual thrust may be determined using a measured engine output power and a measured propeller speed. It should be understood that all thrust determinations are estimated thrust as thrust has no measurement system per se on an aircraft.

In some embodiments, the autothrottle controller 204 receives the thrust change as already determined, for example from an aircraft computer 210. Alternatively, the autothrottle controller 204 calculates the thrust change based on various parameters as received from the aircraft computer 210, the PCS 200, the power throttle 201, and/or various sensors on the aircraft and/or powerplant 100. For example, the actual thrust is determined from the measured engine output power and the measured propeller speed as received from sensors provided on the engine 110 and/or propeller 120. The desired thrust is determined from the requested engine power and the corresponding reference propeller governing speed, as determined from the PLA. In yet another embodiment, the autothrottle controller 204 receives the actual thrust and the desired thrust and determines the difference in order to obtain the thrust change.

In some embodiments, the autothrottle controller 204 receives as input one or more aircraft operating condition, such as aircraft speed, ambient temperature, ambient temperature, altitude, and the like. The operating conditions may also be used to calculate an estimated thrust, for example using the following equation:

$$\text{Thrust} = \frac{\text{Power}}{\text{airspeed}} \eta_{prop}$$

Where $\eta_{prop}$ is the propeller efficiency, which is determined by the propeller supplier and may vary as a function of flight phase and speed of the aircraft. Other factors that may affect propeller efficiency are aircraft angle of attack, propeller speed, power, altitude, and ambient temperature. Other factors may also apply. For example, $\eta_{prop}$ may be in the order of 60% at takeoff power and typical V1 speed of the aircraft, in the range of 80% to 83% in climb rotational speed and power, and 85% to 87% in cruise rotational speed and power. Other values may also apply, as propeller efficiency is specific to propeller blade design and the design points that the propeller blade has been optimized for.

Referring back to method 300, optionally at 304, the thrust change is converted to a power value. In other words, a conversion is made to determine what difference in input power is needed to cause the thrust change. Indeed, while the output of the engine may be measured via the propulsion force, what is input to the engine is measured in terms of power. The power generated by the engine 110 is then converted into thrust by the propeller 120. Therefore in order to speak to the engine 110, the autothrottle controller 204 communicates in terms of power. Note that method 300 may be performed without step 304. The conversion from thrust to power allows for an easier determination of a setting change at step 306, due to the mapping of engine power and throttle position.

At 306, a setting change is determined for at least one control input of the powerplant 100 when the thrust change or power value is greater than a threshold. The setting change corresponds to a change in one or more powerplant input control so as to cause a change in engine power proportional to the thrust change or power value. The setting change may cause an increase or a decrease to a currently requested engine power.

Figure 4:
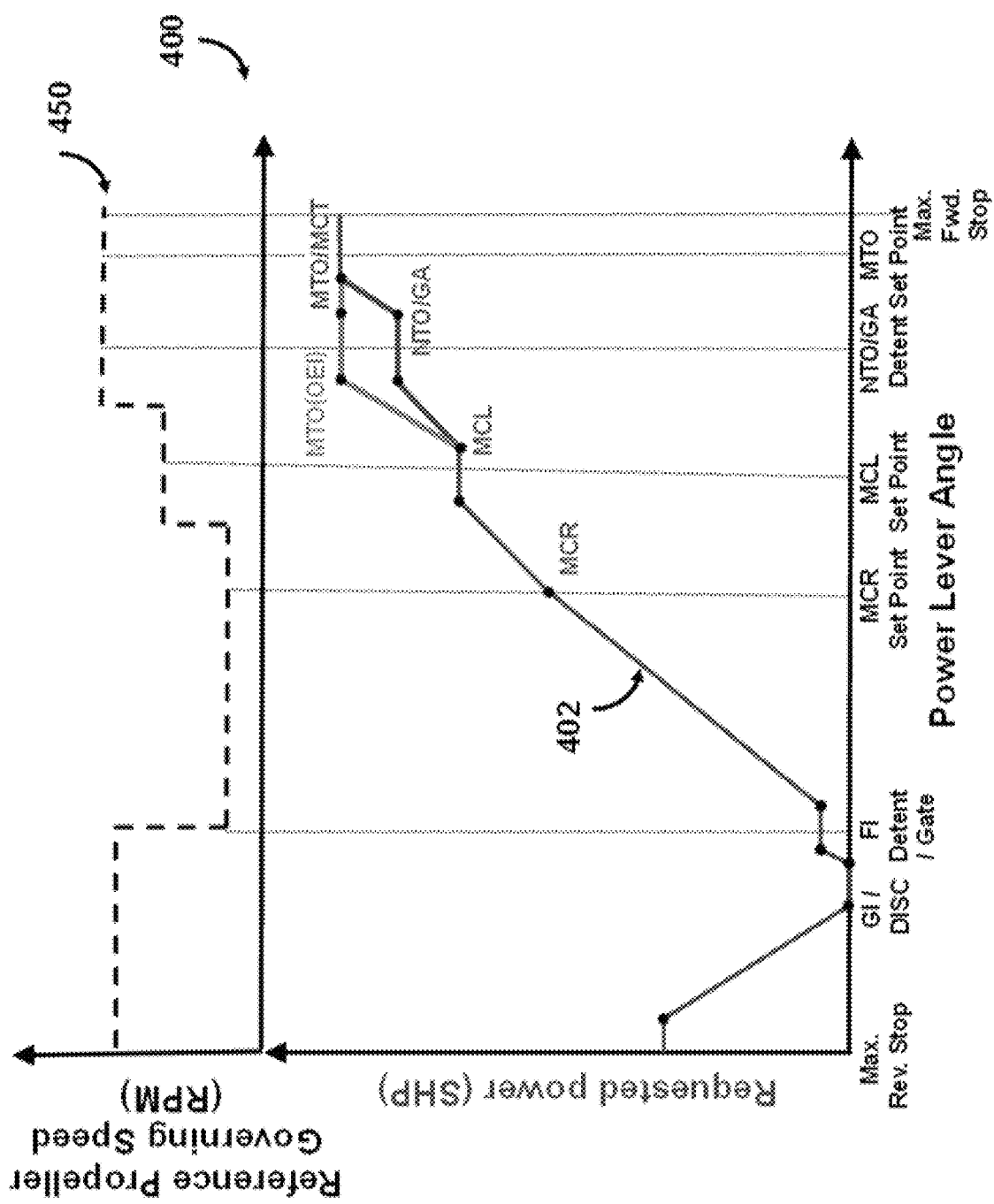
FIG. 4 is a graphical representation of an example relationship between requested power/requested propeller governing speed and power lever angle.

In some embodiments, the input control is for the power throttle 201 associated with the PCS 200. For example, the input control may be the position of the power throttle, i.e. the PLA. FIG. 4 illustrates an example lookup table 400 for mapping requested engine power to PLA. A curve 402 shows a relationship between the PLA (horizontal axis) and the requested power (vertical axis). Another curve 450 shows the relationship between the lever angle (horizontal axis) and the reference propeller governing speed (vertical axis). The curve 402 is aligned with the curve 450, which share a common horizontal axis, and points on the curve 402 can be mapped with points on the curve 450.

As defined above, the power value as converted from the thrust change corresponds to a change in requested power to be applied to the engine. For a given power value, a new requested power is found by adding the power value to the current requested power. For example, if the power value is +50 hp and the current requested engine power is 650 hp, then the new requested power used in the table 400 to determine PLA is 700 hp. If the power value is −35 hp and the current requested engine power is 650 hp, then the new requested power used in the table 400 to determine PLA is 615 hp. The corresponding PLA is found on the horizontal axis using the curve 402.

Figure 5:
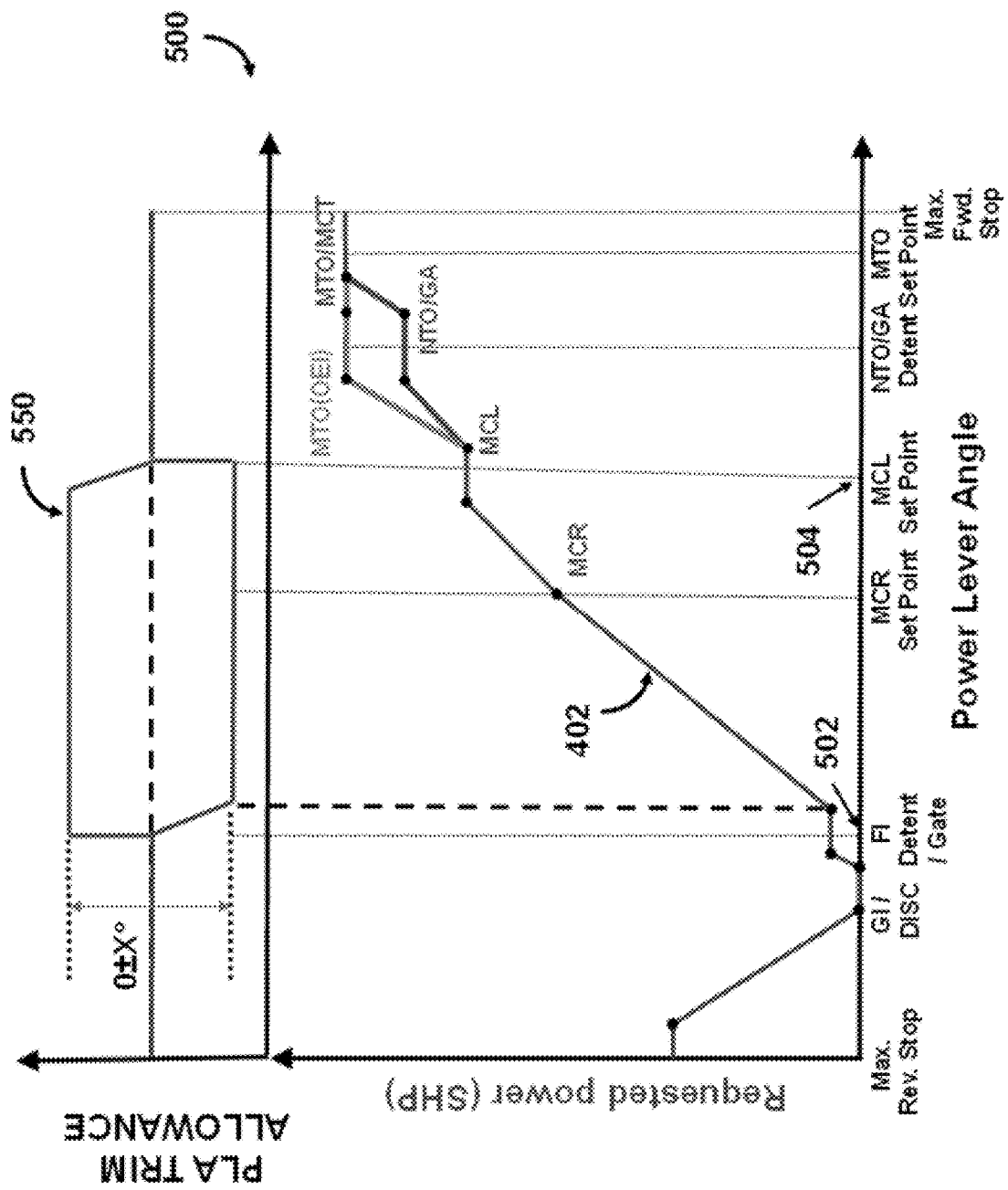
FIG. 5 is a graphical representation of an example relationship between requested power/PLA trim scheduling and power lever angle.

In some embodiments, the input control corresponds to a PLA trim, which is a fine adjustment of the PLA sent to the controller PCS 200 that does not require a physical change in the position of the throttle 202. PLA trim is used for small adjustments in commanded power in order to achieve the requested engine power. FIG. 5 illustrates an example lookup table 500 for mapping PLA trim to PLA. In this example, the autothrottle controller 204 may adjust PLA trim only when the PLA is between two defined settings, identified as 502 and 504 on the horizontal axis, for example Flight Idle (FI) and maximum climb (MCL). These settings may be customizable. In some embodiments, PLA trim may be enabled/disabled by a pilot or other operator through a cockpit command. PLA trim may also be disabled in circumstances where fault accommodation is activated for loss of inputs.

In some embodiments, the input control corresponds to both PLA and PLA trim. In other embodiments, the input control corresponds to engine fuel flow and/or propeller pitch angle. Any control input that affects the amount of power generated by the engine 110 and converted into thrust by the propeller 120 may be varied in accordance with the power value. If the power value is lower than the threshold, the method 300 returns to 302 where a new thrust change is determined.

Once the setting change is determined, at least one command is output by the autothrottle controller 204 to cause the setting change, as per 308. The command may be one or more of a PLA command, a PLA trim command, a fuel flow valve command, a propeller speed command, a propeller blade pitch angle command, and the like.

The autothrottle controller 204 may be configured to output a PLA command directly to a throttle quadrant controller (TQC) comprising a servo-motor and a rotary variable differential transformer (RVDT), which in turn controls the power throttle 201. The servo-motor physically moves the power throttle 201 to a given position in accordance with the control command. The RVDT sends electrical signals of the throttle position to the engine controller 210.

A PLA trim command may be sent to the PCS 200, for example to the engine controller 210. The use of the PLA trim added to the physical PLA position modulated with servo-motors is to minimize the throttle movement to accommodate for the uncertainties and variability related to the propeller efficiency $\eta_{prop}$ determination. In some embodiments, the autothrottle controller 204 only interfaces with the engine controller 210 and no direct communication is needed with the propeller controller 220. In some embodiments, the PLA trim is added to the electrical signals sent by RVDT containing the PLA position. The resulting signal is used to determine a power request command to the engine controller 210. The PLA setting will also set the propellers to govern at a corresponding reference rotational speed.

In some embodiments, the autothrottle controller 204 is activated by the pilot upon confirmation that the system is capable of operating in an autothrottle mode. System capability may be dictated by various conditions. For example, the local throttle position is within specified boundaries, such as flight idle and maximum climb. Local and remote throttles are within a specified tolerance of each other, and the take-off phase of the aircraft is complete and the aircraft is safely in the air. In some embodiments, certain functionalities are also tested before the system is deemed capable of operating in autothrottle mode, such as the data input interface with the aircraft, the channels of the engine controller 210 (in a multi-channel controller), and the throttle position signal to the engine controller 210.

The pilot may set aircraft operating targets for autothrottle. These commands are sent from the pilot interface to the autothrottle controller 204. In some embodiments, this is done through the aircraft avionics. Alternatively, the autothrottle controller 204 may be connected directly to the pilot interface. Once operating targets are set, the pilot may enable autothrottle through an autothrottle request signal sent from the pilot interface to the autothrottle controller 204.

Additional indications provided by the engine controller 210 may be used to dictate whether the autothrottle controller 204 is limited by either an engine limitation or a trim limitation. An engine limitation prevents an increase and/or decrease of requested engine power due to a high/low end engine limit being attained. A trim limitation prevents an increase and/or decrease of requested engine power due to a high/low end trim limit being attained.

In some embodiments, the PLA trim value is set to a default value of 0° when autothrottle is not enabled or when the system is not capable of operating in an autothrottle mode.

In some embodiments, the PLA trim value is frozen, i.e. held constant to a last value, during propeller reference speed setting changes when the autothrottle is engaged, or if the PLA signal is moving at a rate greater than a predetermined amount.

In some embodiments, the PLA trim value is rate limited to a rate deemed necessary to maintain a smooth aircraft operation when transitioning to/from an engaged to a disengaged autothrottle mode, or when unfrozen following propeller speed reference changes or following the PLA signal moving at rate greater than a predetermined amount.

In some embodiments, the engine controller 210 is implemented as a single-channel or dual-channel full-authority digital engine controls (FADEC), an electronic engine controller (EEC), an engine control unit (ECU), or any other suitable engine controller. In some embodiments, the propeller controller 220 is implemented as a propeller electronic control (PEC) unit.

Figure 6:
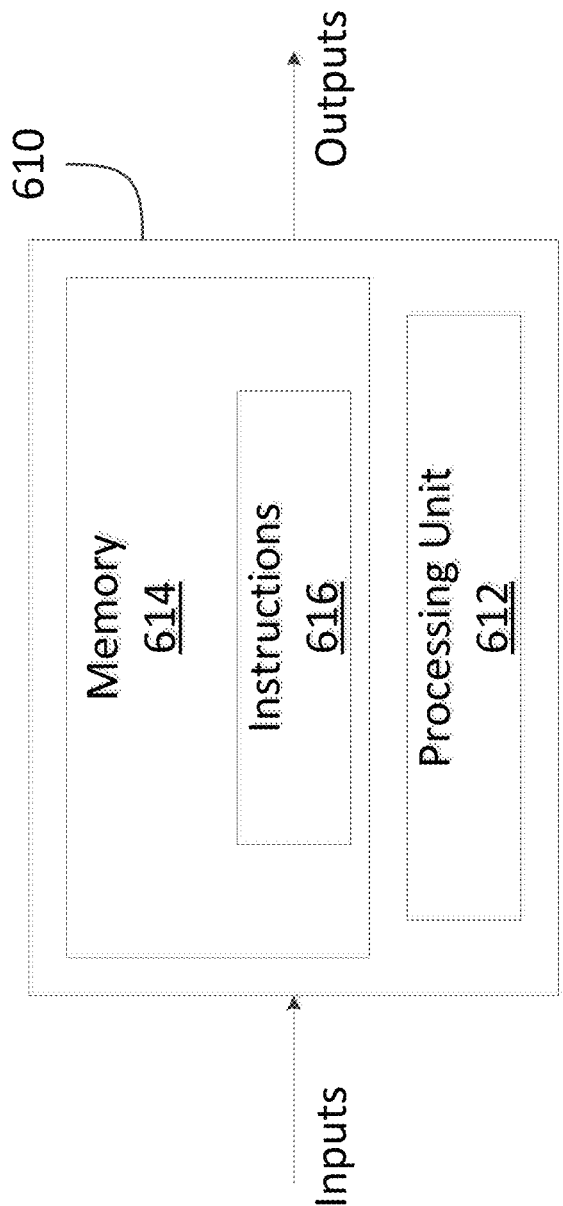
FIG. 6 is an example embodiment of an autothrottle controller.

FIG. 6 illustrates an example embodiment to implement the autothrottle controller 204, so as to perform the method 300. A computing device 610 comprises a processing unit 612 and a memory 614 which has stored therein computer-executable instructions 616. The processing unit 612 may comprise any suitable devices configured to implement the autothrottle controller 204 such that instructions 616, when executed by the computing device 610 or other programmable apparatus, may cause the functions/acts/steps attributed to the autothrottle controller 204 as described herein to be executed. The processing unit 612 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 614 may comprise any suitable known or other machine-readable storage medium. The memory 614 may comprise non-transitory computer readable storage medium, for example, but not limited to, an electronic, magnetic, optical, electromagnetic, infrared, or semiconductor system, apparatus, or device, or any suitable combination of the foregoing. The memory 614 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 614 may comprise any storage means (e.g., devices) suitable for retrievably storing machine-readable instructions 616 executable by processing unit 612.

The methods and systems for autothrottle in a propeller-driven aircraft described herein may be implemented in a high level procedural or object oriented programming or scripting language, or a combination thereof, to communicate with or assist in the operation of a computer system, for example the computing device 610. Alternatively, the methods and systems for autothrottle in a propeller-driven aircraft may be implemented in assembly or machine language. The language may be a compiled or interpreted language. Program code for implementing the methods and systems for controlling operation of aircraft engines may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for autothrottle in a propeller-driven aircraft may also be considered to be implemented by way of a non-transitory computer-readable storage medium having a computer program stored thereon. The computer program may comprise computer-readable instructions which cause a computer, or more specifically the processing unit 612 of the computing device 610, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An aircraft control system for a turboprop engine of an aircraft, the aircraft control system comprising:
   a power plant controller configured for controlling operation of the turboprop engine including a gas turbine engine and a propeller coupled to a shaft of the gas turbine engine, an output power of the gas turbine engine being regulated by regulation of a fuel flow to the gas turbine engine, the propeller converting rotary motion from the shaft of the gas turbine engine into thrust;
   a power throttle having a single lever, a lever angle of the single lever dictating the output power of the gas turbine engine and a corresponding reference propeller governing speed for the propeller; and
   an autothrottle controller operatively connected to the power plant controller and to the power throttle and configured to modulate the output power of the gas turbine engine and to set the reference propeller governing speed without pilot input by causing a change to the lever angle of the single lever based on a difference between an actual thrust of the turboprop engine and a desired thrust of the turboprop engine, wherein activation of the autothrottle controller is conditioned upon a take-off phase of the aircraft being complete, the aircraft being in airborne and the lever angle of the single lever being within a specified boundary.

2. The system of claim 1, wherein the autothrottle controller is configured to cause a change to a power lever angle (PLA) trim of the power throttle.

3. The system of claim 1, wherein the autothrottle controller is integrated into aircraft avionics.

4. The system of claim 1, wherein the autothrottle controller is configured for determining the desired thrust based on inputs provided to the turboprop engine and causing the change to the lever angle of the single lever in order to obtain the desired thrust of the turboprop engine.

5. The system of claim 4, wherein the autothrottle controller receives one or more aircraft operating condition to determine the actual thrust of the turboprop engine, to compare with the desired thrust of the turboprop engine.

6. The system of claim 4, wherein the autothrottle controller is configured for converting the desired thrust into an engine power level proportional to the desired thrust.

7. The system of claim 1, wherein the autothrottle controller is enabled when one or more aircraft operating targets are met.

8. The system of claim 1, wherein the autothrottle controller is enabled when one or more throttle conditions are met.

9. The system of claim 1, wherein the specified boundary is between a flight idle setting and a maximum climb setting.

10. A method for controlling a turboprop engine of an aircraft, the method comprising:
    controlling operation of the turboprop engine of the aircraft using a power plant controller, the turboprop engine including a gas turbine engine and a propeller coupled to the gas turbine engine, the propeller converting rotary motion from the gas turbine engine into thrust;
    dictating an output power of the gas turbine engine and a corresponding reference propeller governing speed for the propeller through a power throttle having a single lever;
    after a completion of a take-off phase of the aircraft, when the aircraft is airborne and when a lever angle of the single lever is within a specified boundary, activating an autothrottle controller; and
    using the autothrottle controller to modulate the output power of the gas turbine engine and setting the reference propeller governing speed without pilot input by causing a change to the lever angle of the single lever based on a difference between an actual thrust of the turboprop engine and a desired thrust of the turboprop engine.

11. The method of claim 10, comprising causing a change to a power lever angle (PLA) trim of the power throttle.

12. The method of claim 10, wherein modulating the output power of the gas turbine engine comprises determining the desired thrust based on inputs provided to the turboprop engine and causing the change to the lever angle of the single lever in order to obtain the desired thrust of the turboprop engine.

13. The method of claim 12, wherein modulating the output power of the gas turbine engine comprises receiving one or more aircraft operating conditions to determine the actual thrust of the turboprop engine, to compare with the desired thrust of the turboprop engine.

14. The method of claim 12, wherein modulating the output power of the gas turbine engine comprises converting the desired thrust into an engine power level proportional to the desired thrust.

* * * * *